(No Model.)
H. H. LIEMKE.
FAUCET.
No. 270,819. Patented Jan. 16, 1883.
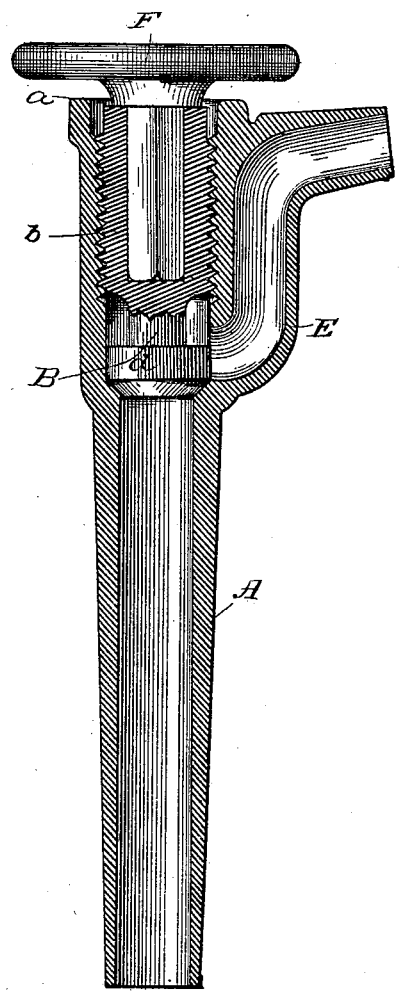
Attest:
Walter Donaldson
F. L. Middleton
Inventor
H. H. Liemke
by Ellis Spear
Atty.

UNITED STATES PATENT OFFICE.

HERMAN H. LIEMKE, OF ST. LOUIS, MISSOURI.

FAUCET.

SPECIFICATION forming part of Letters Patent No. 270,819, dated January 16, 1883.

Application filed May 19, 1882. (No model.)

*To all whom it may concern:*

Be it known that I, HERMAN H. LIEMKE, of St. Louis, in the county of St. Louis and State of Missouri, have invented a new and useful Improvement in Faucets; and I do hereby declare that the following is a full, clear, and exact description of the same.

My invention is an improved faucet adapted to draw liquids of any kind from barrels, kegs, and the like receptacles.

The special objects of my invention are, first, to provide a valve or stop in such faucet which shall always be secure against leakage; and, second, to provide a key in connection with the faucet, said key being removable, so that no unauthorized person can tamper with the faucet.

In the accompanying drawing, the figure shows a central vertical section taken lengthwise through the faucet, with the key in place.

The hollow shank A of the faucet is of ordinary form. The front end is formed with an enlarged bore threaded a part of its length to receive the valve-stem B. Sufficient space is left between the inner end of the threaded portion and the valve-seat for the movement of the valve. The extreme front end of the faucet is formed with a plain end, $a$, to receive the blows of the mallet or hammer used to drive the faucet into its place. The enlarged portion $b$ of the shank of the valve is threaded to fit the threads on the chambered part, and at the end of the shank is a valve, $d$, having a tapering end fitted to a tapering seat. The valve is closed upon its seat by turning, and as it turns upon its seat it grinds the valve upon the seat, thus tending constantly to keep the parts fitted and prevent any inequality in the surface and consequent leakage. A duct, E, leads from the chamber outside of the valve-seat and opens downward. In order to turn the valve, I have provided the shank with an axial hole, square or polygonal in cross-section, into which I insert a key, F, having a shank fitted to the hole. The shank is fitted loosely, so that it can be easily inserted to turn the valve, and when the valve is closed the key can be removed, thus preventing any unauthorized person from opening the valve. One key may serve for any number of faucets.

Having thus described my invention, what I claim is—

In a faucet, the tube A, having a straight cylindrical bore, a discharge-duct, and an enlarged outer end provided with internal screw-threads, and with a conical valve-seat, combined with a valve having a threaded stem and a squared central perforation, and the key F, as set forth.

In testimony whereof I have signed my name to this specification in the presence of two subscribing witnesses.

HERMAN H. LIEMKE.

Witnesses:
F. L. MIDDLETON,
WALTER DONALDSON.